June 30, 1964 A. A. WILES 3,139,137

TIRE MOUNTING AND DEMOUNTING APPARATUS

Filed Dec. 28, 1961

ALFRED A. WILES INVENTOR.

BY
Bailey, Stephens & Huettig
Attorneys

United States Patent Office 3,139,137
Patented June 30, 1964

3,139,137

TIRE MOUNTING AND DEMOUNTING APPARATUS

Alfred A. Wiles, R.F.D. 2, Frederick, Md.

Filed Dec. 28, 1961, Ser. No. 162,741
1 Claim. (Cl. 157—1.1)

The invention relates to equipment for removing tires from wheel rims and to the operation of such equipment.

Machines for mounting and dismounting tires are in widespread use which have a base on which the wheel rests with an upstanding central post. A conical holding member slides up and down on the post and engages in the opening in the center of a wheel to hold the wheel on the base, while a suitable tool journalled on the post is rotated to release a tire from the rim or to apply it on the rim.

Most wheels in use today have a center portion or disc which can be engaged by the conical holder. However, certain types of tractor tires are mounted on rims which are removed from the wheel, and such tires cannot be mounted or dismounted by the conventional machine and this work is ordinarily done by hand with hammers and tire irons.

The object of the present invention is to make it possible to handle tires mounted on such rims on a machine.

A further object of the invention is to provide a simple and inexpensive arrangement for this purpose which is durable and is easy to store when not in use.

Further objects and advantages of the invention will appear more fully from the following description, especially when taken in conjunction with the accompanying drawings which form a part thereof.

Figure 1:
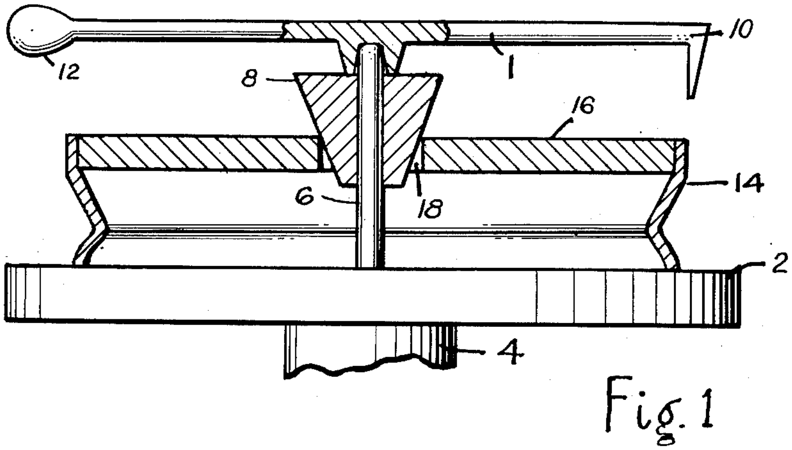
FIGURE 1 shows in vertical cross-section a tire handling machine equipped with a disc embodying the invention.
Figure 2:
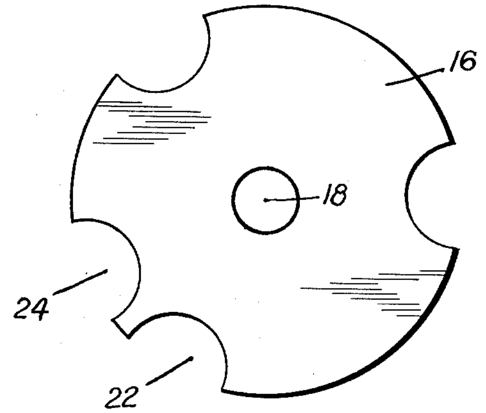
FIGURE 2 is a plan view of the disc.

In the drawings, 2 represents a flat base which is mounted on a pedestal 4 and has a central post 6. A conical holding member 8 is adjustable up and down on the post 6 and is held in position when a wheel is properly engaged. A tool with a working end 10 and a handle 12 is journalled on the central post. Various types of tools can be used for different purposes, and the details of the tools form no part of the present invention.

A disc-less rim such as 14 cannot be handled by such a device. To permit this, I provide a disc 16 with a central opening 18 somewhat larger than the post 6, in which the conical member 8 can engage. FIGURE 1 shows this disc inside a fifteen-inch rim 14. It will be clear that the disc being held down by conical holding member 8 will center and secure the rim on the base 2, so that a tire can be mounted on or removed from the rim by suitable tools journalled on the post 6 or otherwise mounted for movement with respect to the base.

Figure 3:
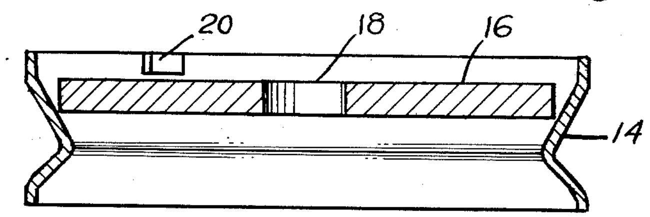
FIGURE 3 shows the disc in use with a larger rim.

The same disc can be used for sixteen-inch rims, since, as shown in FIGURE 3, these rims 14 taper inwardly and the disc will engage within the tapering portion.

The usual rims have three lugs such as 20 by which they are secured to the wheel. The disc 16 has three notches 22 in its edge spaced to fit over these lugs, as well as a notch 24 through which the valve can be reached for inflating or deflating the tube.

While I have described herein one embodiment of my invention, I wish it to be understood that I do not intend to limit myself thereby except within the scope of the claim hereto or hereinafter appended.

I claim:

A tire demounting mechanism for disc-less rims comprising a base, a post upstanding from the base, a conical holding member adjustably mounted on the post, a tool mounted on the mechanism for movement with respect to the base to operate on a rim held on the base, and a disc having a diameter to engage within a disc-less rim and having a central opening larger than the diameter of the post and engageable by said conical holding member to hold such disc-less rim from above in position on the base for operation of the tool on a tire carried by the rim, said disc having notches in its periphery for lugs carried by the rim and having a notch spaced relatively with respect to the lug notches to allow access to the valve of a tube carried by the rim.

References Cited in the file of this patent

UNITED STATES PATENTS

| | | |
|---|---|---|
| 1,538,875 | Stevens | May 19, 1925 |
| 2,505,172 | Coats | Apr. 25, 1950 |
| 3,013,601 | Hildre | Dec. 19, 1961 |